US010495212B2

(12) United States Patent
Grosse Kohorst

(10) Patent No.: US 10,495,212 B2
(45) Date of Patent: Dec. 3, 2019

(54) GEAR SELECTION UNIT FOR AN AUTOMATIC TRANSMISSION FOR A VEHICLE, AND METHOD FOR OPERATING A GEAR SELECTION UNIT

(71) Applicant: ZF Friedrichshafen AG, Friedrichshafen (DE)

(72) Inventor: Berthold Grosse Kohorst, Vechta (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 209 days.

(21) Appl. No.: 15/313,868

(22) PCT Filed: Apr. 27, 2015

(86) PCT No.: PCT/EP2015/059007
§ 371 (c)(1),
(2) Date: Nov. 23, 2016

(87) PCT Pub. No.: WO2015/180904
PCT Pub. Date: Dec. 3, 2015

(65) Prior Publication Data
US 2017/0198805 A1    Jul. 13, 2017

(30) Foreign Application Priority Data
May 27, 2014    (DE) .................. 10 2014 210 126

(51) Int. Cl.
*F16H 59/02*     (2006.01)
*F16H 61/36*     (2006.01)
(Continued)

(52) U.S. Cl.
CPC ......... *F16H 59/0204* (2013.01); *F16H 59/10* (2013.01); *F16H 61/36* (2013.01);
(Continued)

(58) Field of Classification Search
CPC .. F16H 59/02; F16H 59/0204; F16H 59/0278; F16H 59/10; F16H 2059/0282;
(Continued)

(56) References Cited

U.S. PATENT DOCUMENTS 4,630,499 A * 12/1986 Hopkins ................. F16H 59/10
74/473.33
5,622,079 A * 4/1997 Woeste ............... F16H 59/0204
74/335
(Continued)

FOREIGN PATENT DOCUMENTS

DE     102 52 009 A1    5/2004
DE     103 26 118 A1    1/2005
(Continued)

OTHER PUBLICATIONS

International Search Report and Written Opinion of the International Search Authority dated Jul. 24, 2015 in International Application No. PCT/EP2015/059007 (English and German languages) (11 pp.).
(Continued)

*Primary Examiner* — Jake Cook
*Assistant Examiner* — T. Scott Fix
(74) *Attorney, Agent, or Firm* — Brinks Gilson & Lione

(57) ABSTRACT

The present disclosure provides a gear selection unit for an automatic transmission. The gear selection unit may include a mount having a gate, where the gate has an automatic channel oriented in a longitudinal direction and a tapping channel disposed adjacent to the automatic channel, and where the automatic channel and the tapping channel are connected to one another via a connecting channel. A selection lever may be inserted in the gate, and the selection lever may be pivotably supported in the mount. A cable pull slider may be movably supported in the longitudinal direc-
(Continued)

tion in the mount, where the cable pull slider is coupled to the selection lever via a releasable first coupling device when the selection lever is disposed in the automatic channel. A connector may be coupled in the longitudinal direction to the cable pull slider via a second coupling device.

19 Claims, 10 Drawing Sheets

(51) Int. Cl.
*F16H 59/10* (2006.01)
*F16H 61/22* (2006.01)
*F16C 1/10* (2006.01)

(52) U.S. Cl.
CPC ............... *F16C 1/10* (2013.01); *F16H 61/22* (2013.01); *F16H 2059/026* (2013.01)

(58) Field of Classification Search
CPC ...... F16H 61/36; F16C 1/10; Y10T 74/20049; Y10T 74/20067; B60K 20/04
USPC .......................................... 74/473.12, 473.15
See application file for complete search history.

(56) References Cited

U.S. PATENT DOCUMENTS

| | | | | | |
|---|---|---|---|---|---|
| 5,799,539 | A | * | 9/1998 | Haase | F16H 59/0204 200/61.88 |
| 5,845,535 | A | * | 12/1998 | Wakabayashi | F16H 59/0204 74/473.18 |
| 5,884,529 | A | * | 3/1999 | Meyer | F16H 59/0204 74/473.18 |
| 5,921,141 | A | * | 7/1999 | Gouselis | F16H 59/042 74/471 XY |
| 6,125,714 | A | * | 10/2000 | Woeste | F16H 59/0204 74/471 XY |
| 6,192,770 | B1 | * | 2/2001 | Miyoshi | F16H 59/0204 74/473.15 |
| 2001/0004851 | A1 | * | 6/2001 | Kim | F16H 59/0204 74/473.15 |
| 2002/0170376 | A1 | * | 11/2002 | Giefer | F16H 59/10 74/532 |
| 2005/0139031 | A1 | * | 6/2005 | Giefer | F16H 59/0204 74/473.15 |
| 2006/0248976 | A1 | * | 11/2006 | Sickart | F16H 59/0204 74/473.18 |
| 2011/0226079 | A1 | * | 9/2011 | Weifels | F16H 59/0204 74/473.21 |
| 2012/0282014 | A1 | * | 11/2012 | Ersoy | B60G 7/005 403/122 |

FOREIGN PATENT DOCUMENTS

| | | |
|---|---|---|
| DE | 10 2005 001 818 A1 | 7/2006 |
| DE | 10 2007 038 495 A1 | 2/2009 |
| FR | 2 797 229 | 2/2001 |
| WO | WO 2004/042256 A1 | 5/2004 |

OTHER PUBLICATIONS

German Search Report dated Feb. 12, 2015 for German Patent Application No. 10 2014 210 126.3 (German language with two-page English explanations) (10 pp.).

* cited by examiner

GEAR SELECTION UNIT FOR AN AUTOMATIC TRANSMISSION FOR A VEHICLE, AND METHOD FOR OPERATING A GEAR SELECTION UNIT

CROSS REFERENCE TO RELATED APPLICATIONS

This application is a filing under 35 U.S.C. § 371 of International Patent Application PCT/EP2015/059007, filed Apr. 27, 2015, and claims the priority of German Patent Application 10 2014 210 126.3, filed May 27, 2014. These applications are incorporated by reference herein in their entireties.

The present disclosure relates to a gear selection unit for an automatic transmission for a vehicle, as well as to a method for operating the gear selection unit.

BACKGROUND

With an automatic transmission, a gearshift lever can be used for selecting a desired driving mode. In such a driving mode, the automatic transmission can automatically convert an input rotational rate to a necessary output rotational rate through various transmission steps, in response to a torque demand at the output drive.

DE 10 2005 001 818 A1 shows a shifting device for an automatic transmission of a motor vehicle.

With this background, the embodiments of the present disclosure involve an improved gear selection unit for an automatic transmission for a vehicle, as well as an improved method for operating a gear selection unit. Advantageous designs can be derived from the following description.

SUMMARY

The automatic transmission can also shift between the transmission steps in response to a shifting command by a user. The shifting command can be input via a tapping function on the gearshift lever.

For tapping, the gearshift lever can be moved from an automatic setting into a tapping setting. There, the shifting command can be input via a short stroke tapping movement of the gearshift lever, and then electronically transmitted to the automatic transmission. The gearshift lever can be separated from a cable pull by means of the lateral movement, while the cable pull is locked in place so that no contradictory information can be transmitted to the automatic transmission.

A gear selection unit for an automatic transmission for a vehicle comprises the following features:

a mount with a gate, wherein the gate has an automatic channel oriented in the longitudinal direction, and a tapping channel disposed adjacently thereto, oriented in the longitudinal direction, wherein the automatic channel and the tapping channel are connected to one another via a connecting channel oriented in a transverse direction;

a selection lever guided in the gate, which is pivotably supported in the mount;

a cable pull slider, which is supported such that it can move in the mount in the longitudinal direction, wherein the cable pull slider is coupled to the selection lever in the longitudinal direction via a releasable first coupling device when the selection lever is disposed in the automatic channel; and a connector, which is coupled to the cable pull slider in the longitudinal direction via a second coupling device, and to the selection lever in the transverse direction via a third coupling device, wherein the connector is secured in the longitudinal direction via a releasable fourth coupling device on the mount when the selection lever is disposed in the tapping channel.

A mount can be understood to be a structural component of a housing of the gear selection unit. The housing can comprise further components having different functions. The selection lever can be referred to as a shift lever or gearshift. A gate can be a boundary for a movement range of the selection lever. The gate can define linear movement paths for the selection lever. The longitudinal direction can correspond, for example, to a vehicle longitudinal direction, or a pulling direction of a cable pull. The transverse direction can be oriented transverse to the longitudinal direction. In particular, the transverse direction can be a vehicle lateral direction. A cable pull slider can be a component that can move in a linear manner. The cable pull slider can be moved at an angel to a reference surface of the mount. In other words, the cable pull can be disposed at an angle.

The selection lever can be released from the cable pull slider by means of the first coupling device when the selection lever is disposed in the tapping channel. The connector can be released from the mount by means of the fourth coupling device when the selection lever is disposed in the automatic channel. By releasing the couplings of the coupling devices, an independent mobility between the two sides of a coupling element can be ensured.

The selection lever can be connected to the cable pull slider by means of the first coupling device when the selection lever is disposed in the connecting channel. Alternatively, or in addition thereto, the connector can be connected to the mount by means of the fourth coupling device when the selection lever is disposed in the connecting channel. By means of a defined coupling, as long as the selection lever is in the connecting channel, a desired function of the gear selection unit can be ensured.

The first coupling device can comprise a recess and a sliding piece that moves in relation to the recess in the transverse direction. The recess can have at least one first contact surface acting in the longitudinal direction. The sliding piece can have at least one second contact surface, corresponding to the first contact surface. The first contact surface can bear, at least in part, on the second contact surface, when the selection lever is disposed in the automatic channel. Furthermore, the sliding piece can move in the recess, in a direction transverse to the longitudinal direction and the lateral direction. By moving the selection lever, the sliding piece can be moved out of the recess. The first contact surface and the second contact surface can be oriented substantially perpendicular to the longitudinal direction, or a direction of action of the cable pull. The cable pull slider and the selection lever can be mechanically separated and re-connected by means of the first coupling device. The recess can be a part of the cable pull slider, when the sliding piece is a component of the selection lever. Alternatively, the recess can be a part of the selection lever, when the sliding piece is a component of the cable pull slider.

The third coupling device can comprise a recess and a sliding piece that moves in relation to the recess in the longitudinal direction. The recess can have at least one first contact surface acting in the transverse direction. The sliding piece can have at least one second contact surface corresponding to the first contact surface. The sliding piece can be permanently disposed in the recess. The third coupling device can be designed as a double bearing. The third coupling device can execute a linear movement and a rotational movement. The third coupling device can transfer the movement of the selection lever between the automatic channel and the tapping channel to the connector. The recess can be a part of the connector when the sliding piece is a component of the selection lever. Alternatively, the recess can be a part of the selection lever, when the sliding piece is a component of the connector.

The sliding piece of the third coupling device can be designed as a ball-head. As a result of the spherical shape of the sliding piece, the sliding piece can be formed without an additional bearing. In this embodiment, a sphere cannot become tilted in the recess.

The fourth coupling device can comprise a recess and a sliding piece that moves in relation to the recess in the transverse direction. The recess can have at least one contact surface acting in the longitudinal direction. The sliding piece can have at least one second contact surface corresponding to the first contact surface. The first contact surface can bear at least in part on the second contact surface when the selection lever is disposed in the tapping channel. The recess can be a part of the connector when the sliding piece is a component of the mount. Alternatively, the recess can be a part of the mount, when the sliding piece is a component of the connector. The first contact surface and the second contact surface can be oriented substantially perpendicular to the longitudinal direction. The connector connected to the cable pull slider, and the mount can be mechanically separated and re-connected by means of the fourth coupling device.

The cable pull slider can have an interface for a shifting cable. The shifting cable can be referred to as a cable pull. The shifting cable can be designed to transmit a movement of the cable pull slider to the automatic transmission. The shifting cable can be connected to the cable pull slider when installing the gear selection unit in numerous locking positions, in order to compensate for manufacturing tolerances, for example. The interface can have an angular tolerance, in order to compensate for an angular difference between the movement axis of the shifting cable and a movement path of the cable pull slider, and to prevent jamming.

The selection lever can be movably supported about a point of rotation. The cable pull slider can be supported such that it can move linearly at an end facing the shifting cable. At an end facing the selection lever, the cable pull slider can be supported such that it can move about the point of rotation in a curve. The first coupling device can be designed to transform a rotational movement of the selection lever into an approximately linear movement of the cable pull slider. The point of rotation can be defined via a joint having two degrees of freedom. In particular, the selection lever can be supported by a ball joint. The cable pull slider can be supported with sliding pieces in sliding tracks. The shifting cable is designed, in particular, to transmit movements in straight lines.

The first contact surface of the first coupling device, and alternatively or additionally, the second contact surface of the first coupling device, can have a curved design. The contact surfaces can be shaped such that they are concentric to a point of rotation for a relative movement between the cable pull slider and the selection lever. As a result, lower wear and a longer service life can be achieved, despite the divisibility of the first coupling device.

A method for operating a gear selection unit in accordance with the approach presented herein comprises the following steps:

releasing the first coupling device between the selection lever and the cable pull slider, when the selection lever is moved out of the automatic channel into the tapping channel;

connecting the fourth coupling device between the connector and the mount, when the selection lever is moved out of the automatic channel into the tapping channel;

releasing the fourth coupling device between the connector and the mount, when the selection lever is moved from the tapping channel into the automatic channel; and connecting the first coupling device between the selection lever and the cable pull slider, when the selection lever is moved out of the tapping channel into the automatic channel.

The steps of such a method can be implemented advantageously using devices of a specified gear selection unit.

BRIEF DESCRIPTION OF THE DRAWINGS

The embodiments of the present disclosure shall be explained in greater detail, by way of example, based on the attached drawings. Therein.

DETAILED DESCRIPTION

In the following description of preferred exemplary embodiments of the present disclosure, the same or similar reference symbols shall be used for the elements having similar functions depicted in the various figures, wherein there shall be no repetition of the description of these elements.

Figure 1:
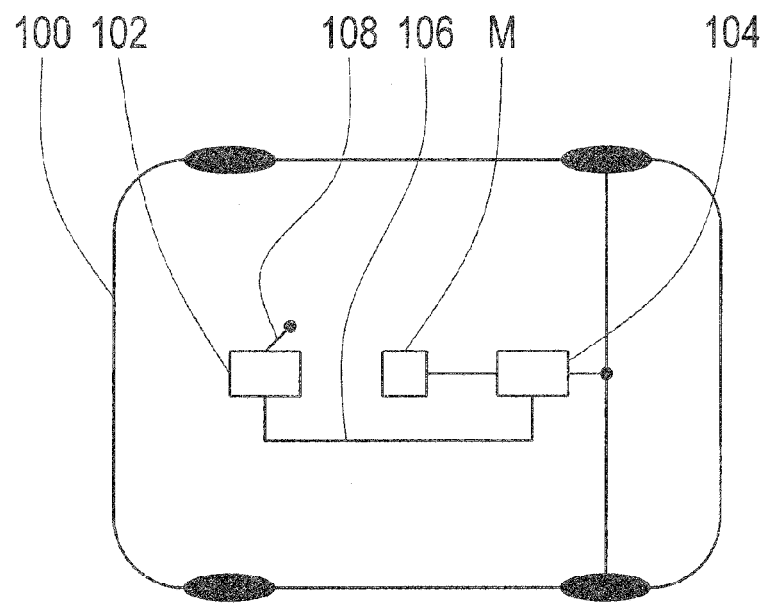
FIG. 1 shows a depiction of a vehicle having a gear selection unit for an automatic transmission of the vehicle in accordance with an exemplary embodiment of the present disclosure.

FIG. 1 shows a depiction of a vehicle 100 having a gear selection unit 102 for an automatic transmission 104 of the vehicle 100 in accordance with an exemplary embodiment of the present disclosure. The gear selection unit 102 is connected, via a shifting cable 106 and electronically, to the transmission 104. A position of a selection lever 108 of the gear selection unit 102 is transmitted to the transmission 104 via the shifting cable 106. The gear selection unit 102 is designed to be operated in an automatic mode and in a tapping mode. The transmission 104 is activated in the automatic mode via the selection lever 108 and the shifting cable 106. In the tapping mode, a shifting command to shift into a higher or lower gear step of the transmission 104 is transmitted electronically. For this, the selection lever 108 is mechanically separated from the shifting cable 106 when in the tapping mode, while the shifting cable 106 is locked in place in the gear selection unit 102. When the automatic transmission 105 is returned to the automatic mode, the selection lever 108 is again mechanically connected to the shifting cable 106, and the shifting cable 106 is again released.

Figure 2:
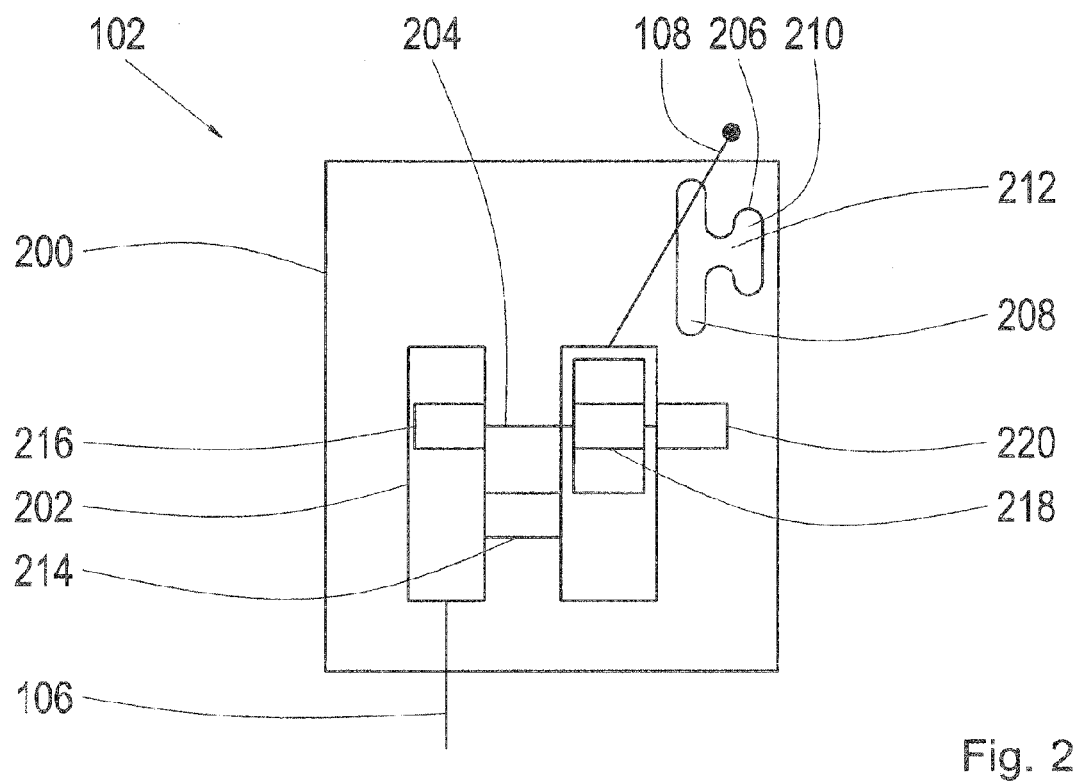
FIG. 2 shows a schematic block diagram of a gear selection unit for an automatic transmission for a vehicle in accordance with an exemplary embodiment of the present disclosure.

FIG. 2 shows a schematic block diagram of a gear selection unit 102 for an automatic transmission for a vehicle in accordance with an exemplary embodiment of the present disclosure. The gear selection unit 102 corresponds substantially to the gear selection unit in FIG. 1. The gear selection unit 102 has, aside from the selection lever 108, a mount 200, a cable pull slider 202, and a connector 204. The selection lever 108 is pivotably supported in the mount 200. The mount 200 comprises a shifting gate 206 having an automatic channel 208 and a tapping channel 210 disposed adjacent thereto, in which the selection lever 108 is movably guided. The automatic channel 208 and the tapping channel 210 are oriented in accordance with an exemplary embodiment in a longitudinal direction of the vehicle, when in the installed state. In one exemplary embodiment, the automatic channel 208 and the tapping channel 210 are oriented in a pulling direction of the shifting cable 106 for connecting the gear selection unit 102 to a transmission. The automatic channel 208 and the tapping channel 210 are connected to one another via a connecting channel 212, which is oriented transverse to the longitudinal direction. The cable pull slider 202 is connected to the shifting cable 106. The cable pull slider 202 is supported such that it can move in the longitudinal direction in the mount 200. The cable pull slider 202 is coupled to the selection lever 108 in the longitudinal direction via a releasable first coupling device 214 when the selection lever 108 is disposed in the automatic channel 208. The connector 204 is coupled to the cable pull slider 202 in the longitudinal direction via a second coupling device 216. The connector 204 is coupled to the selection lever 108 in the transverse direction via a third coupling device 218. Furthermore, the connector 204 is secured to the mount 200 in the longitudinal direction via a releasable fourth coupling device 220 when the selection lever 108 is disposed in the tapping channel 212.

The selection lever 108 is depicted in FIG. 2, disposed in the automatic channel 208. Thus, the selection lever 108 is coupled to the cable pull slider 202 in the longitudinal direction via the first coupling device 214. At the same time, the connector 204 and the cable pull slider 202 are released from the mount 200 in the longitudinal direction by the fourth coupling device 220. In other words, the cable pull slider 202 moves with the selection lever 108, when the selection lever 108 is moved into the automatic channel 208.

When the selection lever 108 is moved into the tapping channel 120, it is released from the cable pull slider 202 by the first coupling device 214. The selection lever 108 can only be moved from the automatic channel 208 into the tapping channel 210 from a specific position. The cable pull slider 202 is connected in the longitudinal direction to the mount 200 by the connector 204 thereby, using the fourth coupling device 220. In other words, a mobility of the cable pull slider 202 in the longitudinal direction is prevented by the connector 204. The selection lever 108 can move, in contrast, in relation to the connector 204 and the cable pull slider 202, in the longitudinal direction, when it is disposed in the tapping channel 210.

When the selection lever 108 is disposed in the connecting channel 212, the selection lever 108 is still connected to the cable pull slider 202 by the first coupling device 214 in an exemplary embodiment. In order to enable a clean guidance into the connecting channel 212, the connector 204 is connected thereby to the mount 200, likewise by the fourth coupling device 220.

In one exemplary embodiment, the connector 204 is designed as a bolt, which is supported in the cable pull slider 202 such that it can slide in the transverse direction, wherein an axial sliding bearing, such as a sliding bushing between the cable pull slider 202 and the bolt 204, forms the second coupling device 216. The bolt 204 can thus transfer forces to the cable pull slider 202 in the longitudinal direction, while forces in the transverse direction are not transferred. The bolt 204 has a sliding piece as the third coupling device 218, which is supported in a recess of the selection lever 108 such that it can slide in the longitudinal direction. The sliding piece is secured in the recess in the transverse direction, and the selection lever 108 therefore moves the connector 204 when it moves in the transverse direction. Thus, forces in the transverse direction can be transferred to the bolt 204 by the sliding piece.

In an alternative exemplary embodiment, the connector 204 exhibits the longitudinal recess in which a sliding piece connected to the selection lever 108 is supported such that it can move in the longitudinal direction.

The fourth coupling device 220 is likewise designed as an axial bearing, in which the bolt of the connector 204 is inserted when the selection lever 108 is moved through the connecting channel 212 into the tapping channel 210.

A least one component of the housing 200, or the mount 200, respectively, is removed in each of the FIGS. 3 to 10, and thus not depicted, in order to expose a view of the mechanical components of the gear selection unit 102 in accordance with the approach presented herein. When ready for operation, the housing 200 is closed, and the selection lever 108 exits the housing 200 at the gate 206.

Figure 3:
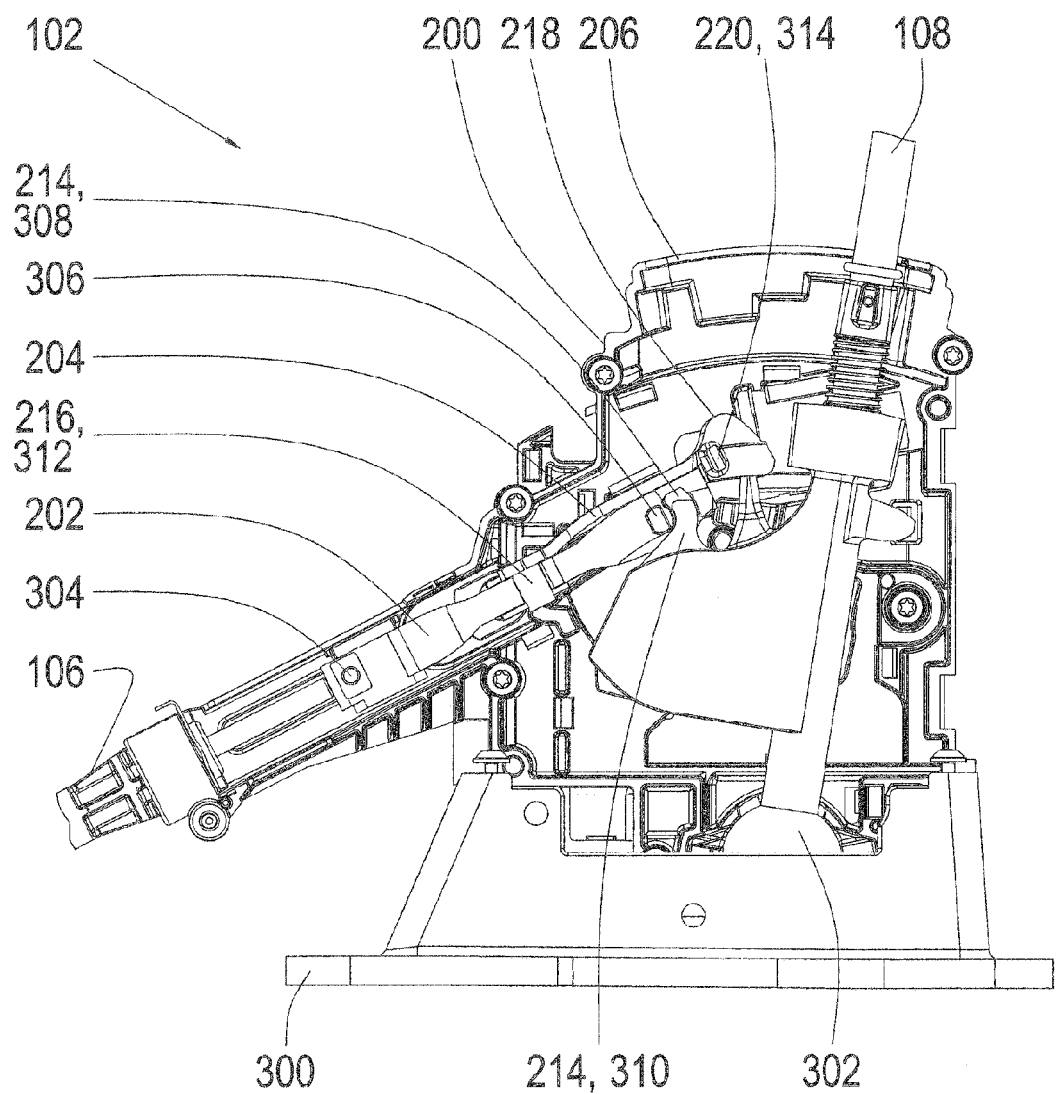
FIGS. 3 to 6 show depictions of a gear selection unit in accordance with an exemplary embodiment of the present disclosure.

FIG. 3 shows a side view of a gear selection unit 102 in accordance with an exemplary embodiment of the present disclosure. The gear selection unit 102 substantially corresponds thereby to the gear selection unit in FIG. 2. The selection lever 108 is illustrated here in a drive setting, or in the position "Drive." This means that the selection lever is depicted here in a rear position in relation to the vehicle. The mount 200, or the housing 200, respectively, of the gear selection unit 102, has a base plate 300 here, for attaching the gear selection unit 102 to a body of a vehicle. The base plate 300 is depicted here, oriented substantially horizontally, at the bottom. The housing 200 thus extends upward from the base plate 300. The gate 206 is disposed on an end of the housing 200 lying opposite the base plate 300. The selection lever 108 has a ball 302 on a lower end. The ball 302 is rotatably supported in a ball socket in the region of the base plate 300. A center of the ball 302 is a rotational point of the selection lever 108 thereby. The selection lever 108 is movably guided in the gate 206, and extends through the gate 206 out of the housing 200. The selection lever 108 is depicted here, cut off above the gate 206. Beneath the gate 206, the selection lever 108 as an angle limiter. The angle limiter delimits an angle in which the selection lever 108 can be moved back and forth between settings that represent a gear selection for a forward driving of the vehicle. The selection lever 108 can likewise be moved into a neutral setting, in which the transmission is shifted to an idling state. In order to move the selection lever 108 into a position that represents reverse driving of the vehicle, the angle limiter must be deactivated. In order to shift the selection lever 108 from the reverse position into the park position, it is necessary to again release the angle limiter. For this, a button, for example, on a handle of the selection lever 108, can be pushed.

The cable pull slider 202 is movably supported in the housing 200. The cable pull slider 202 is connected to the cable pull 106, or the gearshift 106, respectively. The gearshift 106 is disposed at an angle to the base plate 300. Because the selection lever 108 is disposed in the "Drive" position, the cable pull 106 is depicted here in an extended position. In other words, the shifting cable of the cable pull 106 is pulled far out of a sleeve for the shifting cable 106. The cable pull slider 202 has guide pins 304, 306, which are movably supported in guide tracks in the housing 200. The first guide pins 304 are supported on an end of the cable pull slider 202 facing the shifting cable 106 thereby, in straight guide tracks. The second guide pins 306 are supported on an end of the cable pull slider 202 facing the selection lever 108, in curved guide tracks. The curved guide tracks are disposed such that they are concentric to the point of rotation of the selection lever 108, or the ball 302, and have a radius corresponding to their spacing to the point of rotation. The function of the guide tracks can also be assumed by a lever, which is attached to the second guide pins 306 on the cable pull slider 202, and to the housing 200 in the region of the ball 302.

The cable pull slider 202 has a recess 308, having a curved shape, concentric to a center of the second guide pine 306. The selection lever 108 has a complementary projection 310, which likewise has a curved shape, concentric to the center of the second guide pin 306. The recess 308 and the projection 310 form the first coupling device 214. The projection 310 is disposed in the recess 308 in the depiction, and be removed from the recess 308 in the longitudinal direction. The projection 310 is designed to execute a sliding movement about the center of the second guide pin 306 in the recess when the selection lever 108 is moved. The projection 310 is designed to transfer an angular movement, or rotational movement, respectively, of the selection lever 108, in the longitudinal direction, to the cable pull slider 202, and thus to the shifting cable 106. During the movement, the projection 310 slides up or down inside the recess 308. A first contact surface of the recess slides thereby on a corresponding second contact surface of the projection 310.

The connector 204 is rotatably supported in the cable pull slider 202. For this, a rotational axle 312 of the connector 204 is locked in place in a recess of the cable pull slider 202. The rotational axle 312 is oriented transverse to the cable pull 106. The connector 204 can thus transfer pushing and pulling forces in the longitudinal direction to the cable pull slider 202. The rotational axle 312 is disposed on a first end of the connector 204 facing the cable pull 106. The rotational axle 312 and the recess form the second coupling device 216. A second end of the connector 204, facing the selection lever 108, is designed such that it can move in the transverse direction to the cable pull slider 202. A part of the third coupling device 218 is disposed on the second end. Here, the connector 204 has a recess extending in the longitudinal direction, in which a sliding piece connected to the selection lever 108 engages. The sliding piece can slide in the recess in the longitudinal direction. In the transverse direction, at least one contact surface of the sliding piece bears on a corresponding contact surface of the recess, in order to transfer forces to the connector 204 in the transverse direction.

Furthermore, a part of the fourth coupling device 220 is disposed on the second end of the connector 204. A projection 314 is disposed here on the connector 204, which is designed to engage in a recess in the mount 200 when the selection lever 108 is disposed in the tapping channel and the connector 204 is laterally displaced by the third coupling device 218. The projection 314 then locks the connector 204 and the cable pull slider 202 in place in the longitudinal direction.

Figure 4:
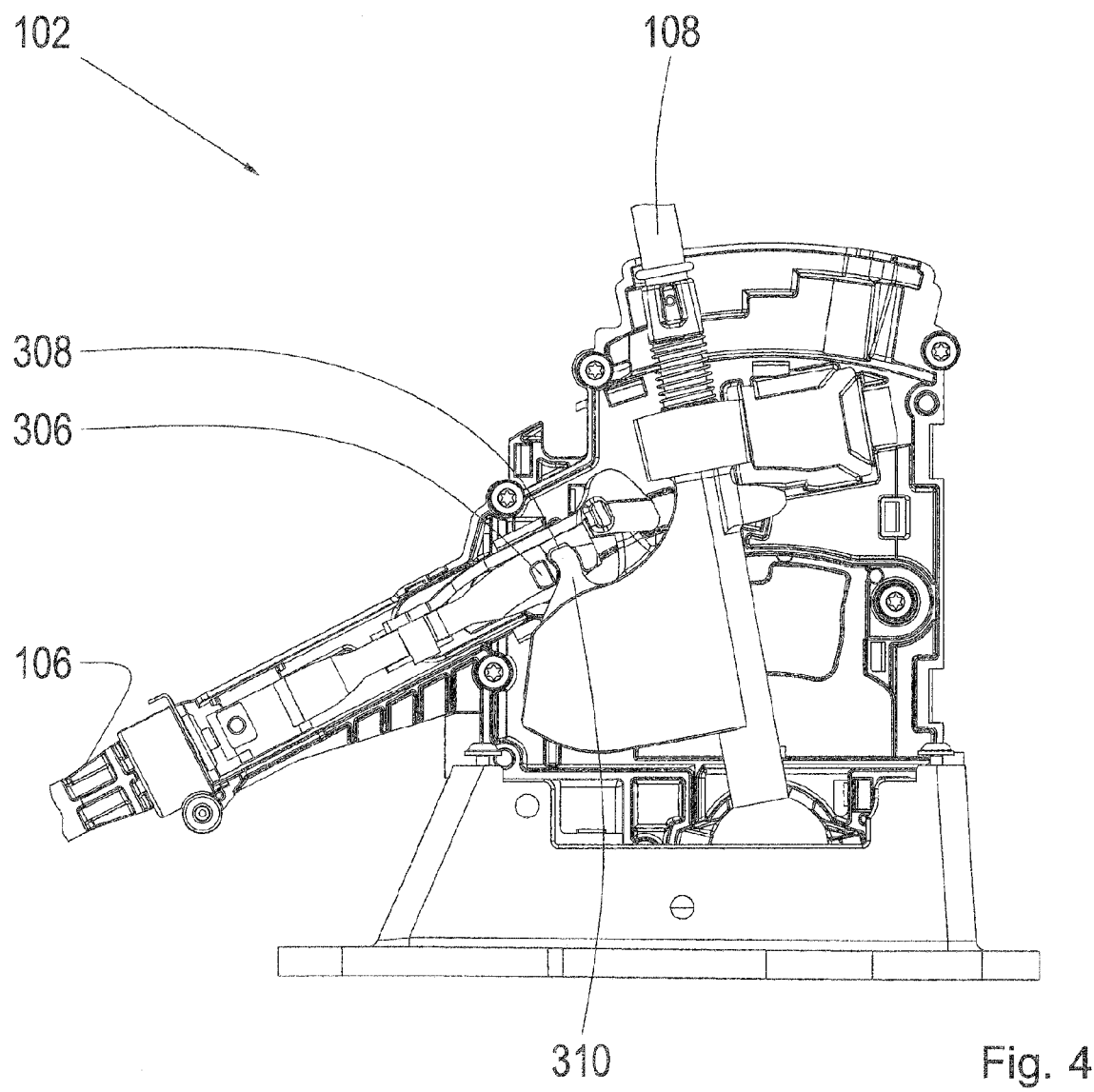

FIG. 4 shows a side view of a gear selection unit 102 according to an exemplary embodiment of the present disclosure. The gear selection unit 102 corresponds to the gear selection unit in FIG. 3. In differing from FIG. 3, the selection lever 108 is depicted here in the "Park" position. This means that the selection lever 108 is disposed in a forward position in relation to the vehicle here. The shifting cable 106 is depicted in a retracted position for this reason. The projection 310 has slid here, concentrically about the center of the second guide pin 306, and been inserted as far as possible into the recess 308.

An exemplary embodiment of the present disclosure shall be described in detail below, based on FIGS. 1 to 4. FIGS. 1 to 4 show, in other words, a shift actuation 102 with an attachment lever 204 on the cable pull slider 202 for securing the shifting cable 106 when changing channels.

The cable pull slider 202 is guided in the housing 200. As a result of the approach presented herein, an additional component for angle and height compensation is not necessary when changing channels or when moving the selection lever 108 into the channels. The securing of the cable pull slider 202 when changing channels can also occur via a transverse slider 204 on the cable pull slider 202, as is the case in FIG. 2.

As a result of the approach presented herein, the height compensating and angle compensating component is no longer needed. Tolerance problems due to an over-determined four-point bearing of the cable pull slider 202 in the shift housing 200 are avoided.

The cable pull slider 202 is guided, on one hand, by two coaxial pins 304, 306. These move in a curve in recesses of the housing half 200 disposed in a curve about the selection lever point of rotation 302. On the other hand, the cable pull slider 202 is guided via the end piece of the shifting cable 106 in the counter bearing of the cable pull 106. The counter bearing has a slightly conical opening for this, in order to enable minor angular movements of the cable pull slider 202.

The application of force from the selection lever 108 to the cable pull slider 202 occurs via a curved plate 310, which is formed on the selection lever 108, and which engages in a corresponding curved opening 308 of the cable pull slider 202. The axis of the curved plate 310 is identical to the axes of the two pins 306 of the cable pull slider 202. As a result of this arrangement, when the selection lever 108 is moved longitudinally, an angular movement with respect to the cable pull slider 202 is possible, without an additional wear-reducing component.

When changing channels, the curved plate 310 of the selection lever 108 is removed from the opening 308 of the cable pull slider 202, and can then move freely in the longitudinal direction during a tapping movement.

In the transition from the automatic channel to the tapping channel, the cable pull 106 is secured in the position "D." For this, a lever 204 that can be pivoted laterally is attached to the cable pull slider 202, the plate 314 of which engages in an opening 500 of the shift housing 200 when the selection lever 108 is pivoted, and thus secures the cable pull slider 202 in its position. In order to implement the lateral movement of the attachment lever 204, a ball-head plate 218 is formed on the selection lever 108. This engages in the oblong pocket 218 of the attachment lever 204. Thus, a free mobility of the ball-head plate 218 is possible with a tapping movement and shifting to the automatic channel. When the selection lever 108 is moved laterally, the attachment lever 204 is moved therewith as well.

Figure 5:
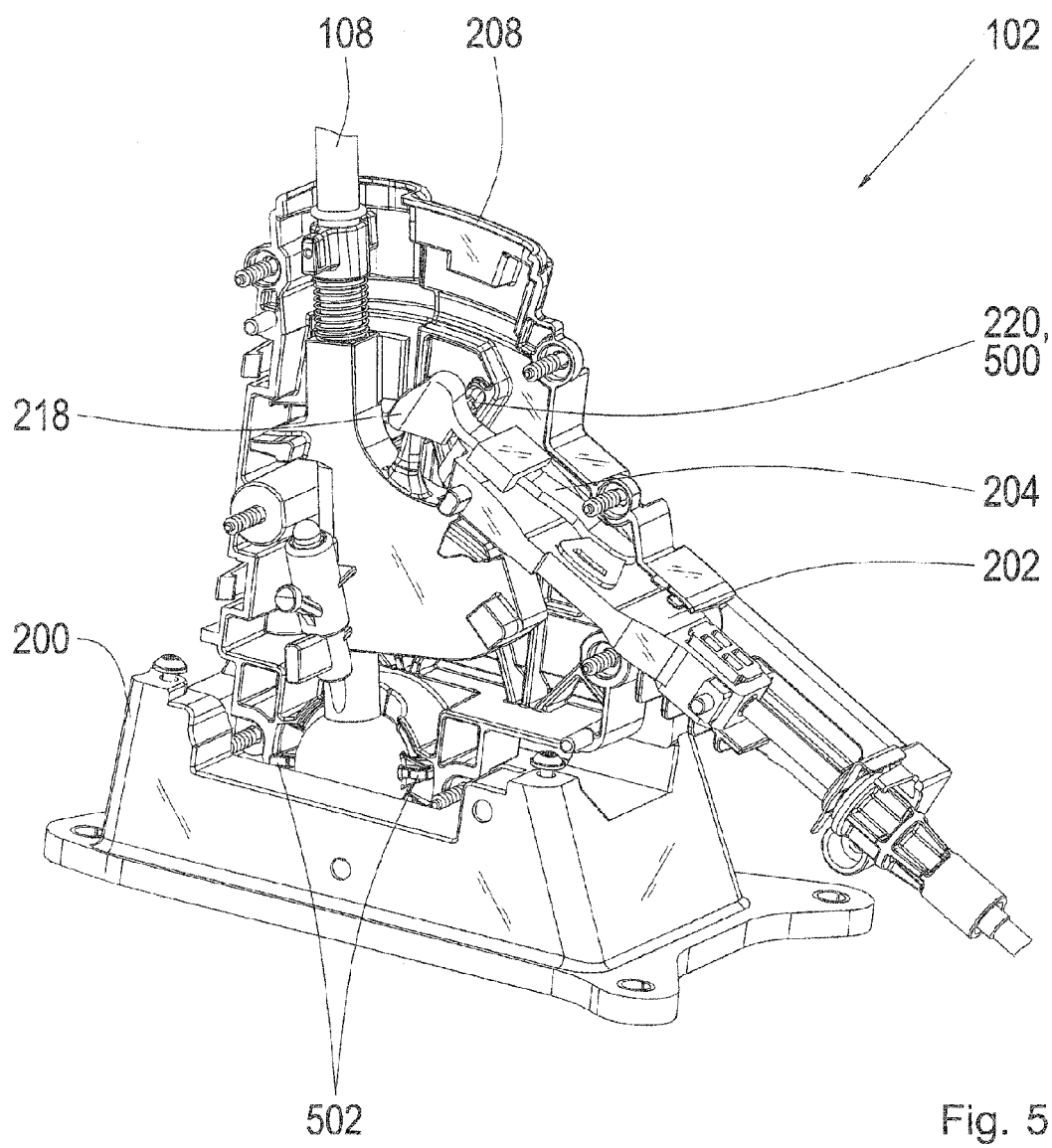

FIG. 5 shows a spatial view of a gear selection unit 102 in accordance with an exemplary embodiment of the present disclosure. The gear selection unit 102 corresponds to the gear selection unit in FIGS. 3 and 4. The gear selection unit 102 is shown here from another side. For this, other parts of the housing 200 are removed from the illustration. Herein, a recess 500 in the housing 200 is depicted as another part of the fourth coupling device 220. The selection lever 108 is depicted here disposed in the automatic channel 208. Because the connector 204 is coupled to the selection lever 108 in the transverse direction via the third coupling device 218, the connector 204 is pivoted toward the automatic channel 208. As a result, the projection of the fourth coupling device 220 is retracted from the recess 500 in the housing 200. The recess 500 and the projection each have contact surfaces that act in the longitudinal direction, and are complementary to one another, in order to be able to accommodate potential forces that may arise. The cable pull slider 202 can thus be moved in the longitudinal direction in the depicted state, and is not blocked by the fourth coupling device 220 in the longitudinal direction.

The ball 302 of the selection lever 108 has two projections 502, disposed diametrically opposed to one another, which engage in corresponding recesses of the housing 200 of the gear selection unit 102 as a safeguard against rotation for the selection lever 108. As a result, the selection lever 108 cannot be rotated about its longitudinal axis.

Figure 6:
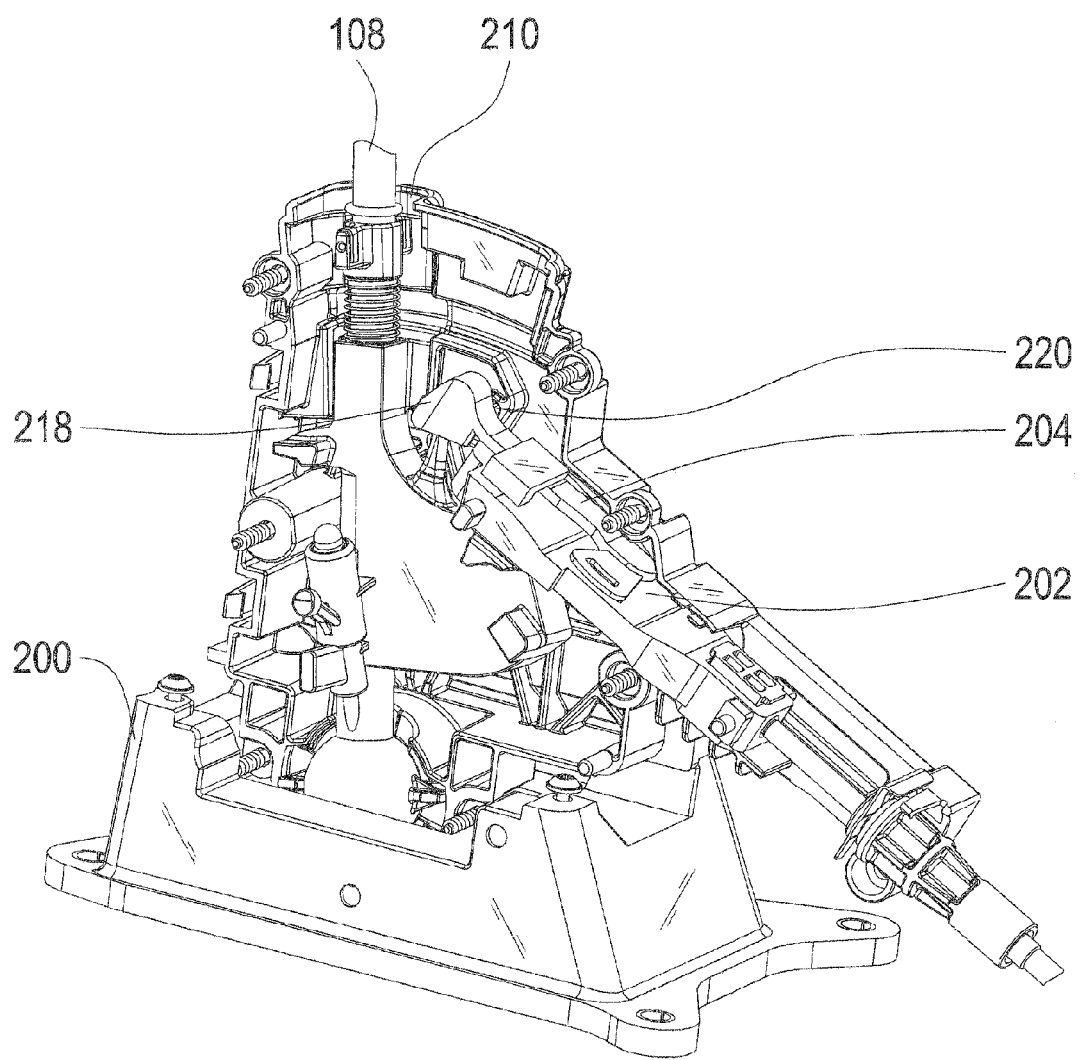

FIG. 6 shows a spatial view of the gear selection unit 102 in accordance with an exemplary embodiment of the present disclosure, as it is depicted in FIG. 5. In contrast thereto, the selection lever 108 is disposed here in the tapping channel 210. The connector is pivoted toward the tapping channel 210 by the third coupling device 218. The projection of the fourth coupling device 220 then engages in the recess of the housing 200 and blocks movement of the cable pull slider 202 in the longitudinal direction.

Figure 7:
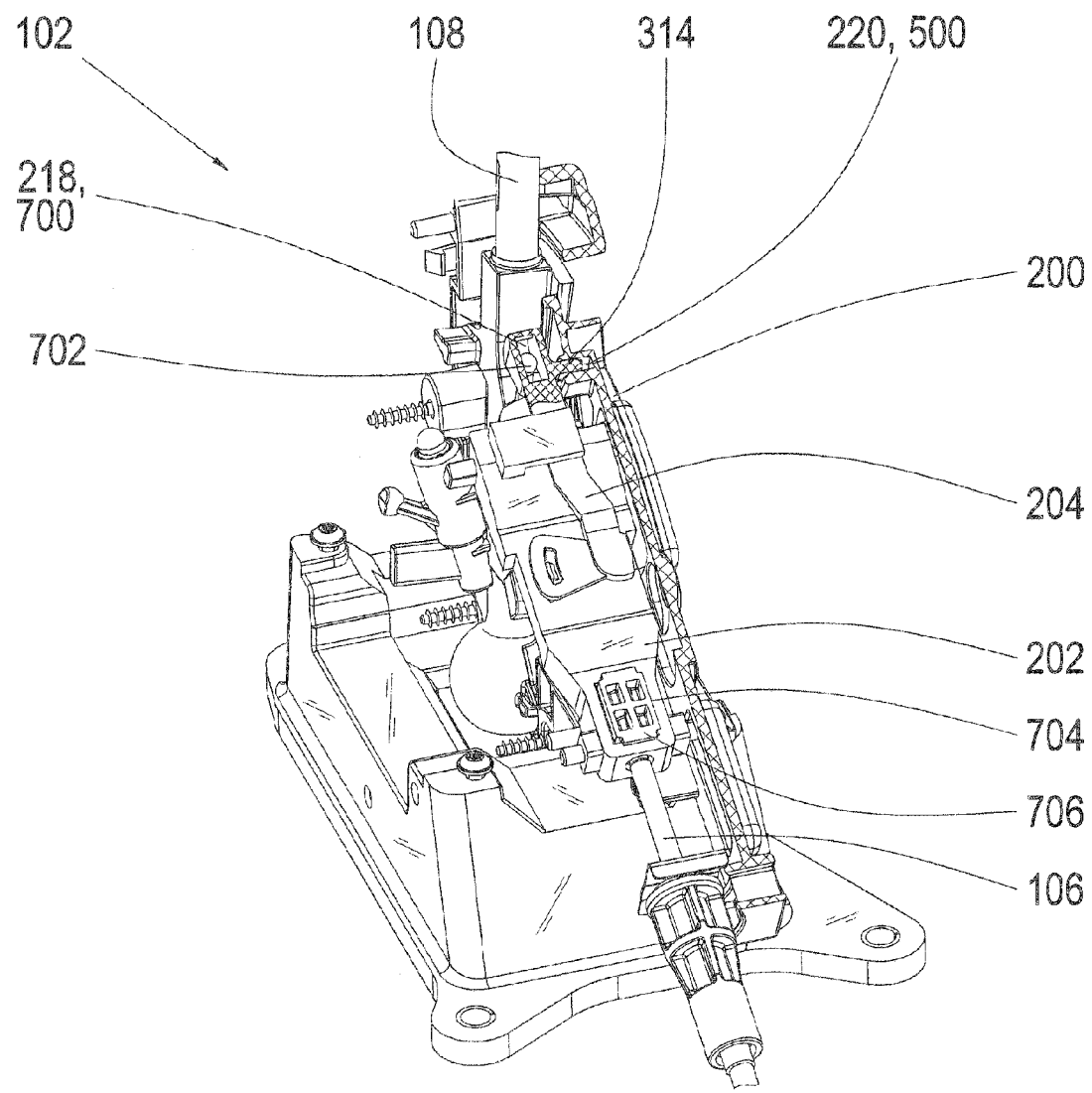
FIG. 7 shows a sectional view through a fourth coupling unit in accordance with an exemplary embodiment of the present disclosure.

FIG. 7 shows a sectional view through a gear selection unit 102 in accordance with an exemplary embodiment of the present disclosure. A cutting plane in FIG. 7 lies thereby in the fourth coupling unit 220. The selection lever 108 is disposed in the tapping channel, as in FIG. 6, such that the connector 204 is pivoted by the selection lever 108 toward the tapping channel via the third coupling device 218. As a result, the projection 314 is disposed in the recess 500 of the housing 200.

The third coupling device 218 is formed here by a recess 700 oriented in the longitudinal direction, and a ball-head 702 disposed therein such that it can slide. The ball-head 702 is connected to the selection lever 108, and the recess 700 is a part of the connector 204. The ball-head 702 can move longitudinally inside the recess 700. The ball-head 702 bears on the recess 700 in the transverse direction, and carries the connector 204 with it.

It can be seen here that the guide pins 304, 306 of the cable pull slider 202 are disposed symmetrically on both sides of the cable pull slider 202, in order to enable a stationary bearing of the cable pull slider 202. The movement of the selection lever 108 is transferred thereby, via the first coupling device, to the cable pull slider 202 at the middle thereof in order to prevent a tilting of the cable pull slider 202. In other words, the cable pull 106, the first coupling device, and the selection lever 108 are disposed in a straight line. In addition, the third coupling device 218 is likewise disposed in this line.

The cable pull 106 is connected to the cable pull slider 202 via an adjustable interface 704. When the gear selection unit 102 is installed in the vehicle, the cable pull 106 is inserted into the interface 704, the cable pull slider 202 and the cable pull 106 are oriented to one another in a relative position, and a locking element 706 is inserted into a receiver of the interface 704 provided for this, in order to lock the shifting cable 106 in the targeted relative position.

Figure 8:
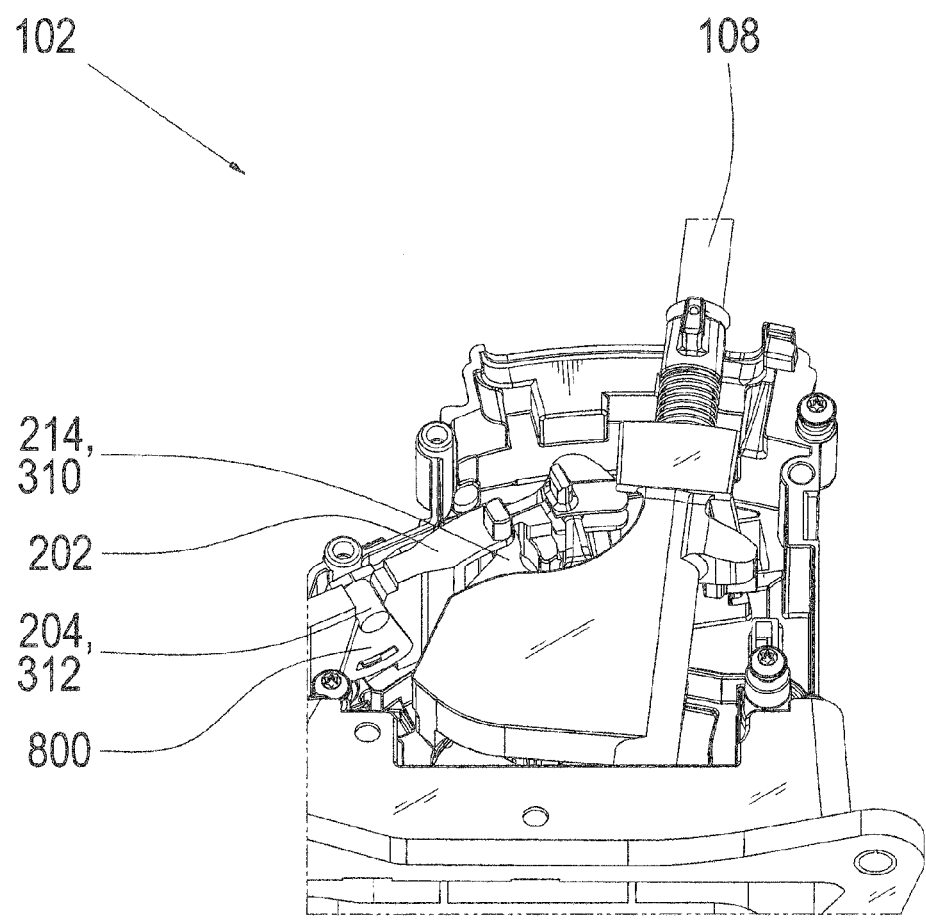
FIGS. 8 to 10 show detail depictions of a gear selection unit in accordance with an exemplary embodiment of the present disclosure.

FIG. 8 shows a detailed view of a gear selection unit 102 in accordance with an exemplary embodiment of the present disclosure. The gear selection unit 102 corresponds substantially to the gear selection unit in FIGS. 3 to 7. The selection lever 108 is disposed here in the tapping channel, meaning that the first coupling device 214 is decoupled. The selection lever 108 can thus move in the longitudinal direction in relation to the cable pull slider 202. The rotational axle 312 of the connector 204 is secured against falling out of the cable pull slider 202 by a securing element 800 that is locked in place. The securing element 800 has a curved slot, in which a locking lug of the cable pull slider 202 is locked in place, in order to enable a rotational movement with a limited rotational angle for the connector 204.

In the tapping mode, the selection lever 108 can move independently of the cable pull slider 202, because the projection 310 of the first coupling element 214 is removed from the recess. Here, the selection lever 108 is depicted while it is retracted in the tapping channel, i.e. in a so-called "position-tap-minus."

Figure 9:
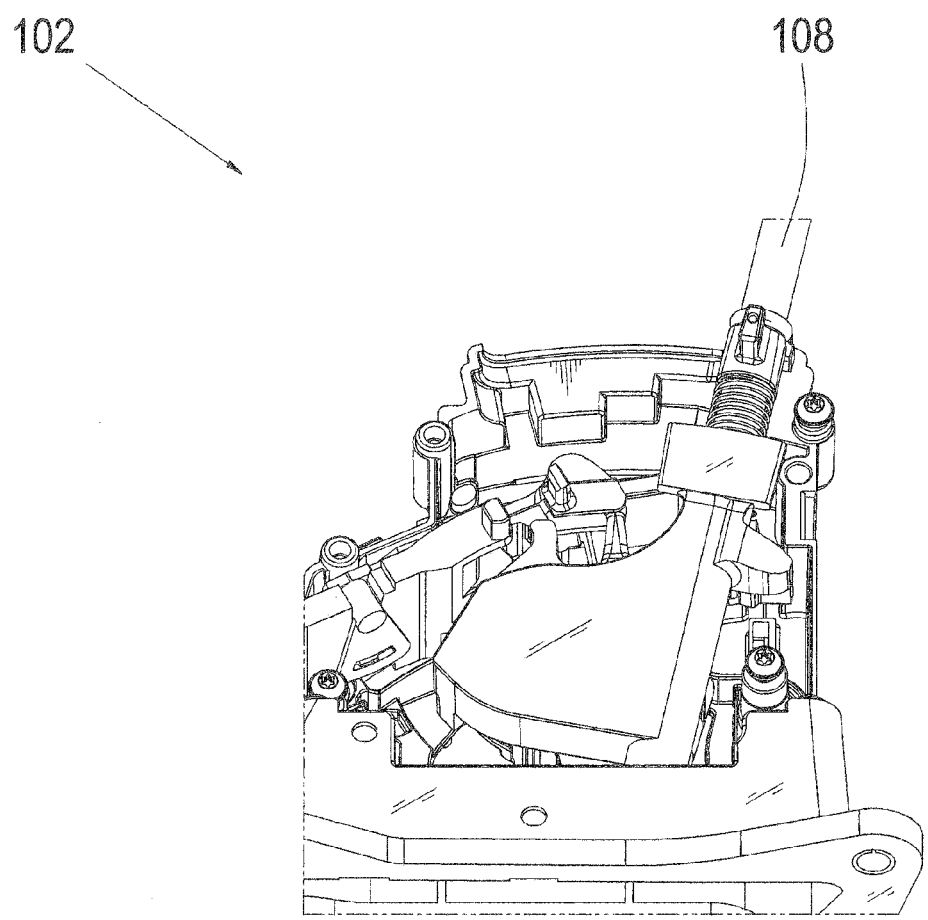
Figure 10:
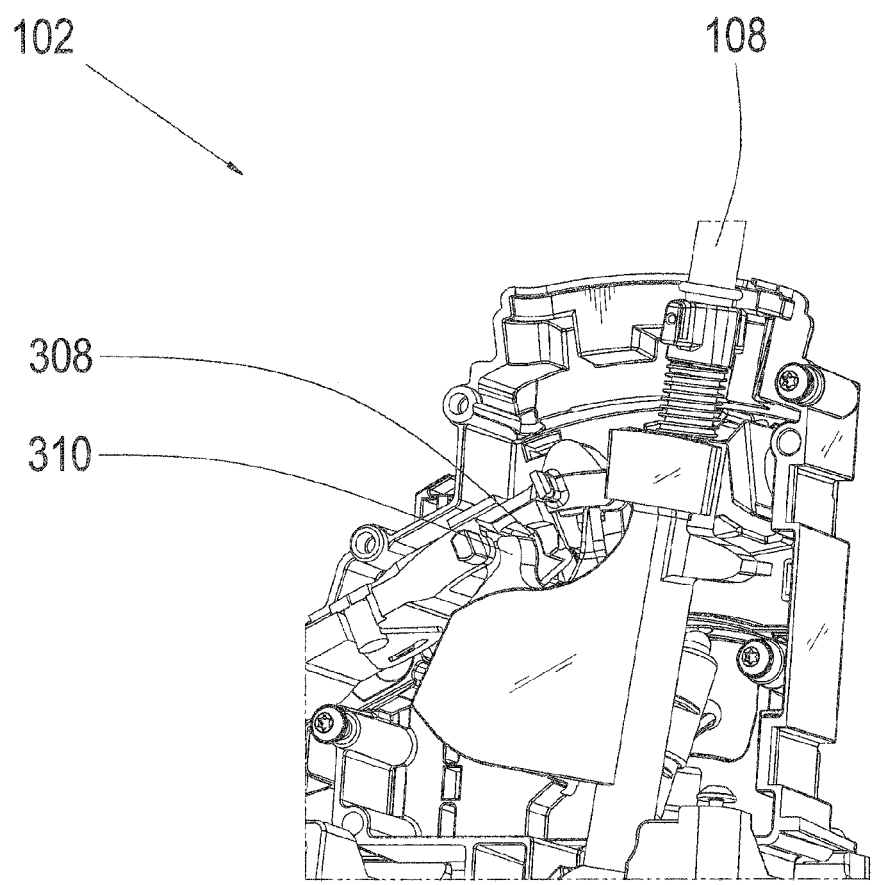

FIG. 9 shows a detailed view of a gear selection unit 102 in accordance with an exemplary embodiment of the present disclosure. The gear selection unit 102 corresponds substantially to the gear selection unit in FIGS. 3 to 8. The selection lever 108 is disposed here in the tapping channel. In this position, the selection lever 108 can be moved, via the connecting channel of the gate, from the tapping channel into the automatic channel and back.

Figure 11:
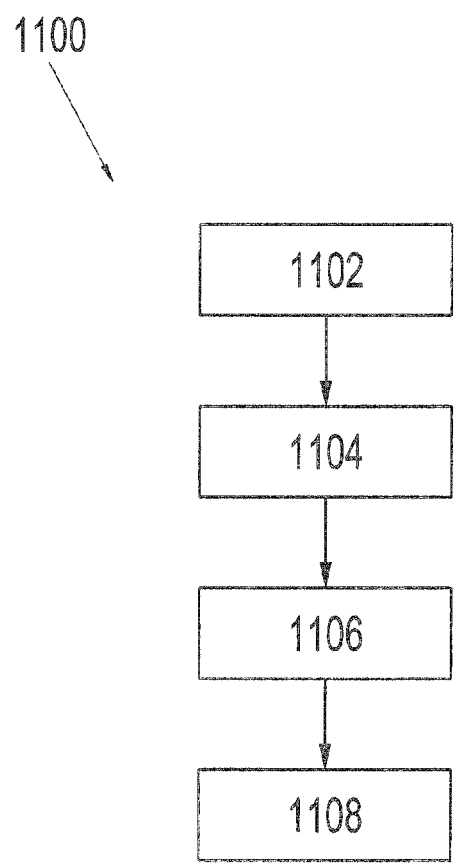
FIG. 11 shows a flow chart of a method for operating a gear selection unit in accordance with an exemplary embodiment of the present disclosure.

FIG. 11 shows a flow chart for a method 1100 for operating a gear selection unit in accordance with an exemplary embodiment of the present disclosure. The method 1100 can be executed on a gear selection unit, such as is depicted in FIGS. 1 to 10. The method 1100 has a first step 1102 for releasing, a first step 1104 for connecting, a second step 1106 for releasing, and a second step 1108 for connecting. In the first step 1102 for releasing, the first coupling device between the selection lever and the cable pull slider is released when the selection lever is moved from the automatic channel into the tapping channel. In the first step 1104 for connecting, the fourth coupling device between the connector and the mount is connected when the selection lever is moved from the automatic channel into the tapping channel. In the second step 1106 for releasing, the fourth coupling device between the connector and the mount is released when the selection lever is moved from the tapping channel into the automatic channel. In the second step 1108 for connecting, the first coupling device between the selection lever and the cable pull slider is connected when the selection lever is moved from the tapping channel into the automatic channel.

The exemplary embodiments described herein, and shown in the Figures, are selected merely by way of example. Different exemplary embodiments can be combined with one another, in their entirety or with respect to individual features. Moreover, an exemplary embodiment can be supplemented by features of another exemplary embodiment.

Furthermore, method steps according to the present embodiments can be repeated as well as executed in a sequence other than that described herein.

If an exemplary embodiment comprises an "and/or" conjunction between a first feature and a second feature, this can be read to mean that the exemplary embodiment in accordance with one embodiment has both the first feature as well as the second feature, and in accordance with another embodiment, has either just the first feature or just the second feature.

REFERENCE SYMBOLS 100 vehicle
102 gear selection unit
104 automatic transmission, transmission
106 shifting cable
108 selection lever
200 mount, housing
202 cable pull slider
204 connector
206 gate
208 automatic channel
210 tapping channel
212 connecting channel
214 first coupling device
216 second coupling device
218 third coupling device
220 fourth coupling device
300 base plate
302 ball
304 first guide pin
306 second guide pin
308 recess
310 projection
312 axle
314 projection
500 recess
502 projections
700 recess
702 ball-head
704 interface
706 locking element
800 securing element
1100 method for operating a gear selection unit
1102 first step for releasing
1104 first step for connecting
1106 second step for releasing
1108 second step for connecting

We claim:

1. A gear selection unit for an automatic transmission for a vehicle, the gear selection unit comprising:
a mount having a gate, wherein the gate has an automatic channel oriented in a longitudinal direction and a tapping channel disposed adjacent to the automatic channel and oriented in the longitudinal direction, wherein the automatic channel and the tapping channel are connected to one another via a connecting channel oriented in a transverse direction;
a selection lever inserted in the gate, the selection lever being pivotably supported in the mount, wherein a ball located at a bottom of the selection lever is located in a ball socket that is fixed relative to a base plate of the gear selection unit;
a cable pull slider, the cable pull slider being movably supported in the longitudinal direction in the mount, wherein the cable pull slider is coupled to the selection lever via a releasable first coupling device when the selection lever is disposed in the automatic channel, the first coupling device having an element that is fixed to the selection lever at a position above the bottom of the selection lever; and
a connector, wherein the connector is coupled to the cable pull slider via a second coupling device, the second coupling device including an axle and second recess such that the connector is pivotable with one degree of rotation relative to the cable pull slider, wherein the connector is coupled in the transverse direction to the selection lever via a third coupling device, and wherein the connector is secured to the mount in the longitudinal direction via a releasable fourth coupling device when the selection lever is disposed in the tapping channel.

2. The gear selection unit of claim 1, wherein the selection lever is released from the cable pull slider by the first coupling device when the selection lever is disposed in the tapping channel.

3. The gear selection unit of claim 1, wherein the selection lever is coupled to the cable pull slider by the first coupling device when the selection lever is disposed in the connecting channel.

4. The gear selection unit of claim 1, wherein the first coupling device comprises a recess and a sliding piece that is movable in the transverse direction in relation to the recess, wherein the sliding piece is fixed relative to the selection lever, wherein the recess has at least one first contact surface acting in the longitudinal direction, wherein the sliding piece has at least one second contact surface corresponding to the first contact surface, and wherein the first contact surface at least partially bears the second contact surface when the selection lever is disposed in the automatic channel.

5. The gear selection unit of claim 1, wherein the third coupling device comprises a recess and a sliding piece that can move in the longitudinal direction in relation to the recess, wherein the recess has at least one first contact surface acting in the transverse direction, wherein the sliding piece has at least one second contact surface corresponding to the first contact surface, and wherein the sliding piece is permanently disposed in the recess.

6. The gear selection unit of claim 5, wherein the sliding piece of the third coupling device includes a ball-head.

7. The gear selection unit of claim 1, wherein the fourth coupling device comprises a recess and a sliding piece that is movable in the transverse direction in relation to the recess, wherein the recess has at least one first contact surface acting in the longitudinal direction, wherein the sliding piece has at least one second contact surface corresponding to the first contact surface, and wherein the first contact surface at least partially bears the second contact surface when the selection lever is disposed in the tapping channel.

8. The gear selection unit of claim 1, wherein the cable pull slider has an interface for shifting a cable, wherein the cable is configured to transfer a movement of the cable pull slider to the automatic transmission.

9. The gear selection unit of claim 1, wherein the cable pull slider is supported such that the cable pull slider can move linearly at an end facing a shifting cable, and wherein the first coupling device is designed to transfer a rotational movement of the selection lever into a substantially linear movement of the cable pull slider.

10. A method for operating a gear selection unit, the method comprising:

releasing a first coupling device coupling a selection lever and a cable pull slider, such that the selection lever and the cable pull slider are released from one another, when the selection lever is moved from an automatic channel of a mount into a tapping channel of the mount, wherein the automatic channel and the tapping channel are connected to one another via a connecting channel;

connecting a second coupling device to couple a connector and the mount when the selection lever is moved from the automatic channel into the tapping channel;

releasing a second coupling device coupling a connector and the mount, such that the connector is released from the mount, when the selection lever is moved from the tapping channel into the automatic channel; and connecting the first coupling device between the selection lever and the cable pull slider when the selection lever is moved from the tapping channel into the automatic channel, wherein the first coupling device includes a recess located within the cable pull slider and having at least one curved contact surface for receiving a sliding projection, the sliding projection being fixed relative to the selection lever.

11. A gear selection unit for an automatic transmission for a vehicle, the gear selection unit comprising:

a mount having a gate configured to receive a selection lever such that the selection lever is pivotably supported in the mount, wherein the gate has an automatic channel oriented in a longitudinal direction and a tapping channel disposed adjacent to the automatic channel and oriented in the longitudinal direction, wherein the automatic channel and the tapping channel are connected to one another via a connecting channel oriented in a transverse direction;

a cable pull slider, the cable pull slider being movably supported in the longitudinal direction in the mount, wherein the cable pull slider is configured to couple to the selection lever via a releasable first coupling device when the selection lever is disposed in the automatic channel, and wherein the first coupling device includes a recess located within the cable pull slider and having at least one curved contact surface for receiving a sliding projection, the sliding projection being fixed relative to the selection lever; and a connector, wherein the connector is coupled in the longitudinal direction to the cable pull slider via a second coupling device, wherein the connector is configured to couple in the transverse direction to the selection lever via a third coupling device, and wherein the connector is configured to be secured to the mount in the longitudinal direction via a releasable fourth coupling device when the selection lever is disposed in the tapping channel.

12. The gear selection unit of claim 11, wherein the cable pull slider is configured such that the selection lever is released from the cable pull slider by the first coupling device when the selection lever is disposed in the tapping channel, and/or the connector is released from the mount by the fourth coupling device when the selection lever is disposed in the automatic channel.

13. The gear selection unit of claim 11, wherein the cable pull slider is configured such that the selection lever is coupled to the cable pull slider by the first coupling device when the selection lever is disposed in the connecting channel.

14. The gear selection unit of claim 11, wherein the recess has at least one first contact surface acting in the longitudinal direction, wherein the sliding projection has at least one second contact surface corresponding to the first contact surface, and wherein the first contact surface is configured such that it at least partially bears the second contact surface when the selection lever is disposed in the automatic channel.

15. The gear selection unit of claim 11, wherein the third coupling device comprises a second recess and a sliding piece that can move in the longitudinal direction in relation to the second recess, wherein the second recess has a first contact surface acting in the transverse direction, wherein the sliding piece has a second contact surface corresponding to the first contact surface, and wherein the sliding piece is permanently disposed in the second recess.

16. The gear selection unit of claim 15, wherein the sliding piece of the third coupling device includes a ball-head.

17. The gear selection unit of claim 11, wherein the fourth coupling device comprises a second recess and a sliding piece that is movable in the transverse direction in relation to the second recess, wherein the second recess has at least one first contact surface acting in the longitudinal direction, wherein the sliding piece has at least one second contact surface corresponding to the first contact surface, and wherein the first contact surface is configured such that it at least partially bears the second contact surface when the selection lever is disposed in the tapping channel.

18. The gear selection unit of claim 11, wherein the cable pull slider has an interface for a shifting cable, wherein the cable is configured to transfer a movement of the cable pull slider to the automatic transmission.

19. The gear selection unit of claim 1, wherein the first coupling device comprises a recess and a sliding projection, and wherein the sliding projection is fixed relative to the selection lever.

* * * * *